(No Model.)

F. SEARLE.
TRICYCLE.

No. 440,442. Patented Nov. 11, 1890.

WITNESSES:
F. McArdle
C. Sedgwick

INVENTOR:
F. Searle
BY Munn & Co.
ATTORNEYS

THE NORRIS PETERS CO., PHOTO-LITHO., WASHINGTON, D. C.

UNITED STATES PATENT OFFICE.

FRANK SEARLE, OF VIRGINIA CITY, MONTANA.

TRICYCLE.

SPECIFICATION forming part of Letters Patent No. 440,442, dated November 11, 1890.

Application filed May 27, 1890. Serial No. 353,363. (No model.)

*To all whom it may concern:*

Be it known that I, FRANK SEARLE, of Virginia City, in the county of Madison and State of Montana, have invented a new and Improved Tricycle, of which the following is a full, clear, and exact description.

The object of the invention is to provide a new and improved tricycle, which is simple and durable in construction, very effective and powerful, and easily propelled with the hands, and conveniently steered by the feet of the rider.

The invention consists of certain parts and details and combinations of the same, as will be hereinafter fully described, and then pointed out in the claims.

Reference is to be had to the accompanying drawings, forming a part of this specification, in which similar letters of reference indicate corresponding parts in all the figures.

Figure 1:
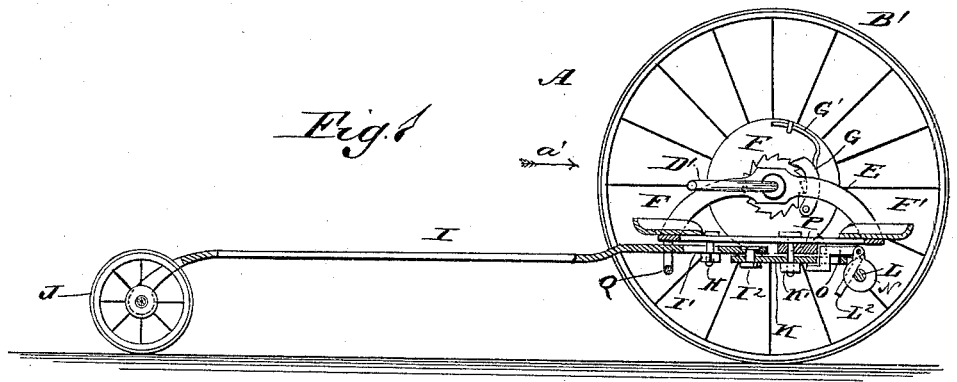
Figure 2:
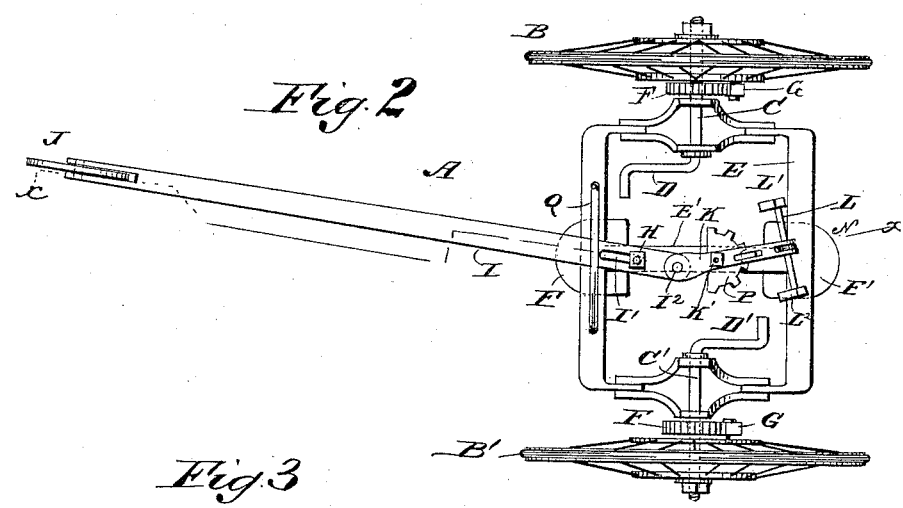
Figure 3:
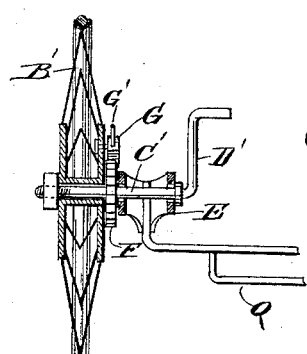
Figure 4:
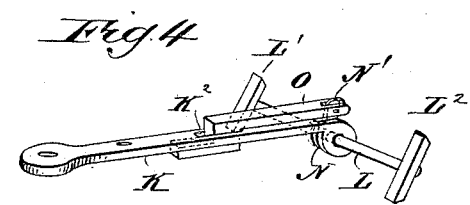

Figure 1 is a sectional side elevation of the improvement on the line $x\ x$ of Fig. 2. Fig. 2 is an inverted plan view of the same. Fig. 3 is a transverse section of one of the main drive-wheels and adjacent parts, and Fig. 4 is a perspective view of the mechanism for operating the steering-wheel.

The improved tricycle A is provided with the two main drive-wheels B and B', mounted to rotate loosely on the outer ends of the shafts C and C', provided at their inner ends with crank-arms D and D', respectively. The shafts C and C' are mounted to turn in suitable bearings arranged in the sides of a main frame E, on the ends of which are formed seats F and F', on which the operators are seated.

On each of the shafts C and C' is secured a ratchet-wheel F, engaged by a pawl G, fulcrumed on the inside of the wheel B or B', respectively, the pawl being pressed in contact with the ratchet-wheel by a suitable spring G'. When the crank-arms D and D' are turned in one direction, the ratchet-wheels F, pressing on the pawls G, turn the main wheels B and B', but when the said crank-arms are moved in an opposite direction, the pawls G glide over the teeth of the ratchet-wheels, so that the wheels B and B' are not affected.

On the middle connecting-bar E' of the main frame E is held a pivot-pin H, passing through a longitudinally-extending slot I', formed in a reach-rod I, extending rearwardly, carrying at the outer end the steering-wheel J. The front end of the reach-rod I is pivotally connected at $I^2$ with a lever K, fulcrumed on a pin K', secured to the longitudinal connecting-bar E' of the main frame E. In the outer end of the lever K is mounted to turn loosely a transversely-extending rod L, provided on its ends with foot-pieces L' and $L^2$, adapted to be engaged by the operator seated on the seat F. On the rod L is also secured a collar N, provided with a lug N', extending upwardly and pivotally connected with a pawl O, mounted to slide on the top of the lever K, and adapted to engage the teeth of a segmental wheel P, rigidly secured on the bar E', the pivot-pin K' being the center.

When the operator presses with the toes of his feet against the upper part of the foot-pieces L' and $L^2$, then the rod L is turned so that the lug N', acting on the pawl O, moves the latter outward and out of contact with the teeth of the wheel P. When the operator presses with the ball part of the feet on the said foot-pieces L' and $L^2$, then the rod L is turned in an opposite direction and the pawl O moves inward and into contact with one of the teeth of the segmental wheel P. The operator, by pressing on one of the foot-pieces L' or $L^2$ changes the position of the lever K, so that the reach-rod I is swung and the steering-wheel J is moved to right or left so as to change the course of the tricycle, according to the direction in which the lever K is moved by the feet of the operator, as above described.

On the under side of the rear bar of the main frame E, is secured a foot-rest Q, on which the operator seated on the seat F' can conveniently rest his feet.

The operation is as follows: In the ordinary position the reach-rod I stands at right angles to the line of the shafts C and C', and is locked in this position by the pawl O engaging the middle tooth of the fixed wheel P. When the tricycle is only used by one person, the seat F is occupied by the person. The feet of the operator are placed on the foot-pieces L' and $L^2$ for manipulating the steering-wheel J, as above described. The hands of the operator are placed on the crank-arms D and D', which are worked forward and backward, so as to turn the shafts C and C', which, by the pawl-and-ratchet mechanism, impart a forward motion to the tricycle in the direction of the arrow $a'$ on the forward motion of the said crank-arms, while on the return-motion of the same the pawls G glide loosely over the said ratchet-wheels.

When the tricycle is used by two persons, they seat themselves on the seats F and F', the party on the seat F' resting his feet on the foot-rest Q, while the other manipulates the steering device, as previously described, and both riders work the crank-arms D and D' in the manner above described in order to propel the tricycle forward. When the operator on the seat F desires to change the course of the tricycle, he first presses with his toes on the upper ends of the foot-pieces L' and $L^2$, so as to move the pawl O out of engagement with the wheel P, after which pressure is exerted on either of the foot-pieces L' or $L^2$ by the respective feet, so that the lever K swings to one side to move the reach-rod I in the opposite direction, thereby changing the course of the trycicle.

Thus it will be seen that the tricycle is easily propelled by the operator manipulating the crank-arms D and D' with the hands, the steering of the tricycle being accomplished by the feet of the operator.

Having thus fully described my invention, I claim as new and desire to secure by Letters Patent—

1. In a tricycle, the combination, with a pivoted reach-rod carrying the steering-wheel, of a lever pivotally connected at one end with the said reach-rod, a transverse rod held in the other end of the said lever and carrying foot-pieces for changing the position of the said lever by the feet of the operator, and a locking mechanism actuated by the turning of the said transverse rod to lock the said lever in place, substantially as shown and described.

2. In a tricycle, the combination, with a pivoted reach-rod carrying the steering-wheel, of a lever pivotally connected at one end with the said reach-rod, a transverse rod held in the other end of the said lever and carrying foot-pieces for changing the position of the said lever by the feet of the operator, a collar having a lug and secured on the said transverse rod, a pawl pivotally connected with the said lug, and a fixed toothed wheel adapted to be engaged by the said pawl, substantially as shown and described.

3. In a tricycle, a main frame, crank-shafts mounted to turn in the said frame, and main wheels held on the said crank-shafts, in combination with a reach-rod fulcrumed on the said main frame and having a steering-wheel, a lever pivotally connected with the said reach-rod and also fulcrumed on the said main frame, a transverse rod held in the said lever carrying foot-pieces for conveniently manipulating the said lever to change the position of the steering-wheel, the seats F F' at opposite ends of the frame, and the rest Q for the occupant of the seat F', the said foot-pieces serving to support the feet of the occupant of seat F, substantially as shown and described.

4. In a tricycle, a main frame, crank-shafts mounted to turn in the said frame, and main wheels held on the said crank-shafts, in combination with a reach-rod fulcrumed on the said main frame and having a steering-wheel, a lever pivotally connected with the said reach-rod and also fulcrumed on the said main frame, a transverse rod held in the said lever and carrying foot-pieces for conveniently manipulating the said lever to change the position of the steering-wheel, and a locking device actuated from the said transverse rod, substantially as shown and described.

5. A tricycle comprising the flat open rectangular frame E, provided with aligned seats F F' on its front and rear cross-bars, upward-curved side bars connecting said cross-bars, crank-axles C C', journaled in said side bars, with their cranks inward, wheels B B', loose on the shafts, a connecting pawl-and-ratchet mechanism, a reach-bar I, having a wheel at its outer end and extending at its inner end under the frame below seat F and provided with a slot I', a bolt H, passing through said slot, and a central frame-bar E', a foot-lever, also pivoted to the lower face of bar E' and to the inner end of the reach, substantially as set forth.

FRANK SEARLE.

Witnesses:
BARCLAY JONES,
EUGENE STARK.